United States Patent [19]

Wang et al.

[11] Patent Number: 4,709,199
[45] Date of Patent: Nov. 24, 1987

[54] VELOCITY FEEDBACK CONTROL OF STEP MOTORS

[76] Inventors: Xian T. Wang, c/o I. Zuckerman, 215 Park Row, Apt. 21H, New York, N.Y. 10038; Rolf Eichenwald, 32 Buckingham Meadow Rd., Setauket, N.Y. 11733

[21] Appl. No.: 748,645

[22] Filed: Jun. 25, 1985

[51] Int. Cl.$^4$ .............................................. H02P 8/00
[52] U.S. Cl. .................................... 318/696; 318/685; 368/157
[58] Field of Search ................. 318/696, 685; 368/157

[56] References Cited

U.S. PATENT DOCUMENTS 4,414,496 11/1983 Watanabe et al. ................... 318/696
4,516,064 5/1985 Oudet et al. ......................... 318/696

Primary Examiner—William M. Shoop, Jr.
Assistant Examiner—Saul M. Bergmann

[57] ABSTRACT

In a control system for a step motor having a rotor and stator, small velocity coils are placed in the stator in quadrature to the main power phase windings. The velocity coils provide velocity feedback signals which are summed with current command signals to gradually damp the step motor. The damped step motor is effective in minimizing its rotor from oscillating about a desired stopping point.

7 Claims, 4 Drawing Figures

VELOCITY FEEDBACK CONTROL OF STEP MOTORS

BACKGROUND OF THE INVENTION

1. Field of the Invention

The present invention relates generally to step motors and, more specifically, to a method for controlling a step motor that employs velocity feedback for damping the response of the step motor.

2. Description of the Prior Art

Step motors are electromagnetic incremental motion actuators which convert digital pulse inputs to an analog output motion. The major advantage of a step motor is that a step motor can execute one step of mechanical rotation for each digital step command without using feedback. When operated without feedback, the single step response of the step motor can be quite oscillatory and may take 100 milliseconds for the oscillations to settle down. For any stepping motor system that does not use feedback, there are several step command situations where the motor will not step correctly.

One such situation occurs at the natural frequency of the step motor. When the step rate is relatively low and close to its natural frequency or at some submultiple of that frequency, the step motor can lose steps. This is because the rotor inertia and too little friction can cause a single-step response to be excessively oscillatory. In addition, at any speed the single step response of the motor is oscillatory and this causes inaccuracies in the position as well as extends the motion time. Accordingly, there is a need for a damping technique which can minimize this undesirable oscillatory motion.

There have been several attempts in the prior art to provide damping to a step motor through the use of feedback. There are electrical techniques that include some type of velocity feedback provided by a tachometer and in some cases displacement or position feedback. There are also mechanical damping techniques that place friction on the motor. These electrical or mechanical techniques are typically used to damp the operation of the step motor over its entire velocity operating range or only during the final step.

U.S. Pat. Nos. 4,446,412 and 4,091,316 which are assigned to Computervision Corporation disclose devices for controlling step motors in which velocity feedback is provided by tachometers. The velocity feedback signals are converted to a command current in U.S. Pat. No. 4,446,412 by using an analog-to-digital converter. The digital feedback signals are then used to address a PROM and converted back to an analog signal before being applied to the step motor. In U.S. Pat. No. 4,091,316 the velocity feedback signals are summed with digitally generated signals and then applied to the step motor.

U.S. Pat. No. 4,286,202, which is assigned to IBM Corporation, discloses a three phase step motor having three reluctance transducers. The reluctance transducers provide feedback signals to achieve large damping such that the phase currents can be controlled when the motor is detented.

SUMMARY OF THE INVENTION

The present invention provides a velocity feedback and control scheme for a step motor that damps the step motor at relatively low speeds to minimize the oscillatory motions of the step motor about the desired stopping point. The step motor includes at least two power phase windings, an amplifier, and a power stage. A pair of relatively small coils are disposed in quadrature to each other and in phase with the two power phase windings and generate signals indicative of the rotary velocity of the step motor. Any method of generating very accurate velocity signals which are in phase with the phase currents may be substituted for the relatively small velocity coils. The outputs of these velocity coils are amplified by gain amplifiers and fed back to gating devices which are responsive to a velocity reference signal. If the actual velocity command is are less than the predetermined reference velocity, the velocity feedback signals are then summed with the current command signals at summing junctions. If the speed command signal is greater than the predetermined reference velocity, the step motor is operated in an open loop fashion. The outputs of the summing junctions are applied to the step motor via the amplifier and power stage. When the rotation of the step motor falls below the reference velocity, the velocity feedback damps the step motor and is effective in minimizing the oscillations of the rotor of the step motor about the desired stopping point.

DETAILED DESCRIPTION OF THE INVENTION

Figure 1:
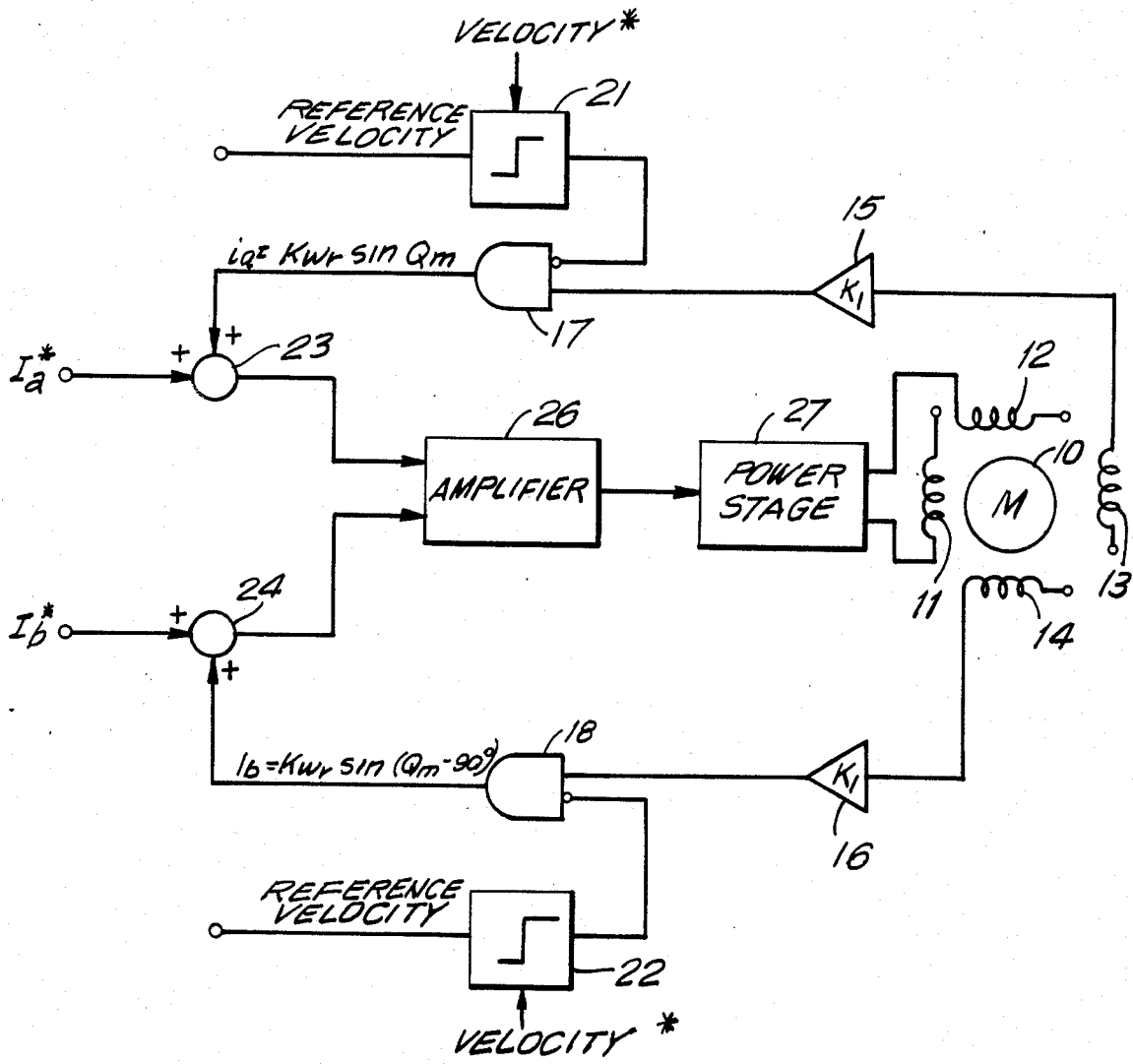
FIG. 1 is a block diagram of the step motor and velocity feedback circuit of the present invention.

A step motor may include a permanent magnet rotor having alternating magnetic poles and a stator usually having at least two power phase windings. The step motor is responsive to digital signals which enable the rotor to be moved in increments or steps. When operated in an open loop mode, the rotor of the step motor tends to oscillate about the desired stopping point when the step motor is brought to a stop. Damping of the step motor can reduce the oscillation about the desired stopping point, but heretofore there has not been a simple reliable electronic way to provide such damping.

In the present invention, damping of the step motor is achieved through the use of velocity feedback. The velocity feedback enables the current of the step motor to be controlled and the position and velocity to be damped when the speed falls below a predetermined reference velocity so that the step motor can be precisely stopped. Without velocity feedback, stopping the step motor causes the step motor to overshoot its desired stopping point. In some instances this overshoot can amount to more than one step or increment of the step motor. The present invention eliminates this overshoot by utilizing velocity feedback from two small velocity coils which are placed in quadrature to the main power phase windings of the step motor. The velocity feedback damps the step motor by controlling the torque on the motor. A mathematical explanation of the damping provided by the present invention will now be provided.

The torque T of a step motor is a function of the rotor position $\theta_m$. For a two phase step motor having phases A and B, the torque can be expressed by the following equation:

$$T = T_a + T_b = -[K_t I_a \sin \theta_m + K_t I_b \sin(\theta_m - 90°)] \quad (1)$$

where $K_t$ = a constant, $I_a$ = a current in winding A, and $I_b$ = a current in winding B.

When the main phase windings A and B are energized by command currents $I_a^*$ and $I_b^*$, the currents $I_a^*$ and $I_b^*$ may be expressed as functions of the desired rotor position, $\theta_E$, by the following equations:

$$I_a^* = I \cos \theta_E \quad (2)$$

$$I_b^* = I \cos(\theta_E - 90°) \quad (3)$$

By substituting equations (2) and (3) for the values $I_a$ and $I_b$ in equation (1) and then simplifying the equation, the torque may be then expressed by the equation:

$$T = -K_t I[\cos \theta_E \sin \theta_m + \cos(\theta_E - 90°) \sin(\theta_m - 90°)] = K_t I \sin(\theta_E - \theta_m) \quad (4)$$

The dynamic mechanical equation of rotor position for the open-loop operation of a step motor is given by the following equation:

$$J d^2\theta_m/d t^2 + D d\theta_m/d t - K_t I \sin(\theta_E - \theta_m) = 0 \quad (5)$$

where J = a moment of inertia and D = a damping coefficient.

Figure 4:
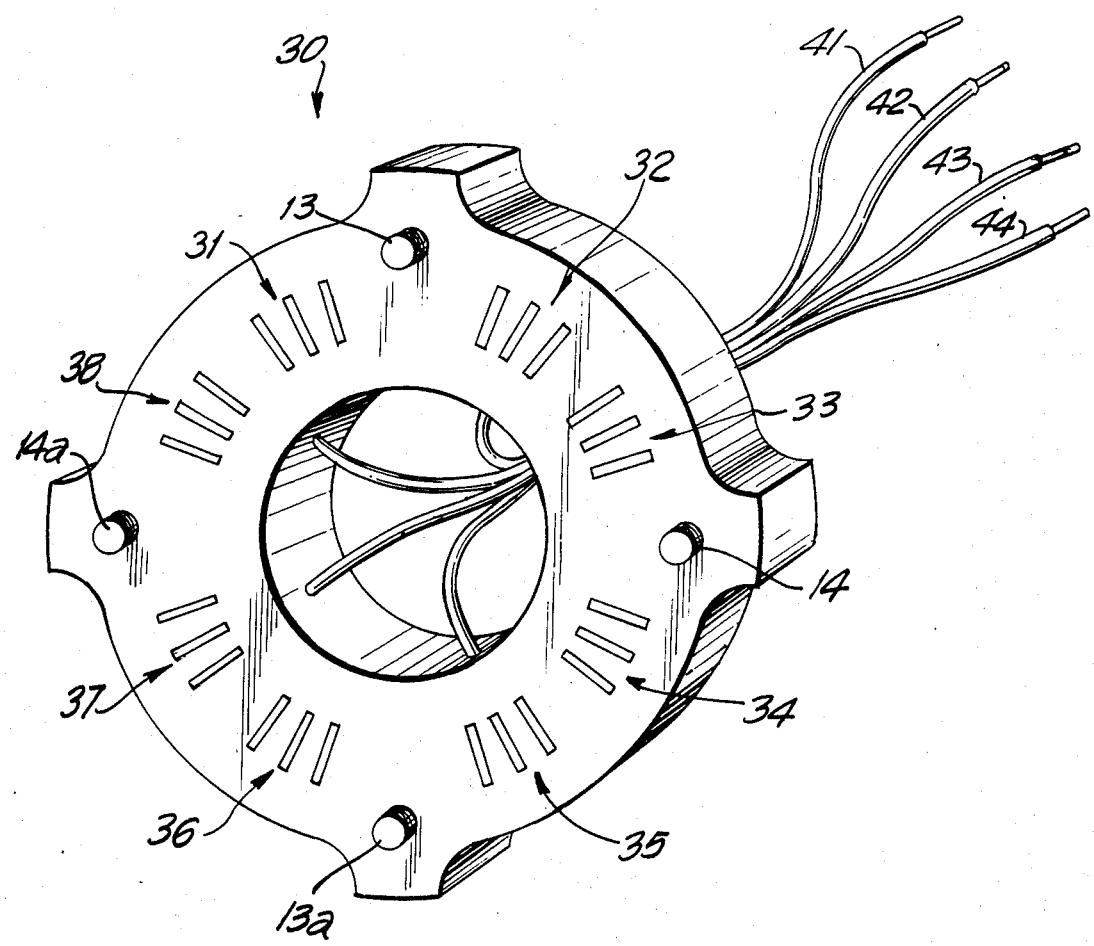
FIG. 4 is a perspective view of half a step motor stator made in accordance with the teachings of the present invention.

In a good quality step motor of the type illustrated in FIG. 4, the magnetic flux density of the step motor versus its displacement curve can be considered as a sine wave. Likewise the flux linkages of the velocity coils 13, 14 may be expressed by the equations:

$$\lambda_{Ka} = \lambda_K \cos \theta_m \quad (6)$$

$$\lambda_{Kb} = \lambda_K \cos(\theta_m - 90°) \quad (7)$$

The equations (6) (7) may be differentiated and the resulting velocity outputs or emf of the velocity coils 13, 14 may be expressed by the equations:

$$v_a = -d\lambda_{Ka}/dt = \lambda_K \omega_r \sin \theta_m \quad (8)$$

$$v_b = -d\lambda_{Kb}/dt = \lambda_K \omega_r \sin(\theta_m - 90°) \quad (9)$$

where
$$\omega_r = d\theta_m/dt$$

In the closed-loop system illustrated in FIG. 1, the outputs of the velocity coils 13, 14 are fed back and the outputs of gates 17, 18 are proportional to the equations (8) and (9) listed above.

The amplifier 26 is designed to accept the sum of command signals and the feedback signals provided by the summing junctions 23, 24. Thus, the phase currents applied to the amplifier 26 may be expressed by the equations:

$$I_a = I_a^* + K_1 v_a = I \cos \theta_E + K\omega_r \sin \theta_m \quad (10)$$

$$I_b = I_b^* + K_1 v_b = I \cos(\theta_E - 90°) + K\omega_r \sin(\theta_m - 90°) \quad (11)$$

The torque equation for the closed loop system may then be expressed by the equation:

$$T = -K_t[I \cos \theta_E \sin \theta_m + K\omega_r \sin^2 \theta_m + I \cos(\theta_E - 90°) \sin(\theta_m - 90°) + K\omega_r \sin^2(\theta_m - 90°)] = K_t I \sin(\theta_E - \theta_m) - K\omega_r \quad (12)$$

The dynamic mechanical equation of rotor position for the closed loop case of FIG. 1 can be expressed by the following equation:

$$J d^2\theta_m/d t^2 + (D+K) d\theta_m/d t - K_t I \sin(\theta_E - \theta_m) = 0 \quad (13)$$

The coefficient of the first derivative term is D+K. By increasing the value of this coefficient the damping of the closed loop system of FIG. 1 is increased. The coefficient K may be adjusted by increasing or decreasing the amount of feedback. This adjustment is a function of the gain of the gain amplifiers 15, 16. Accordingly, a proper damping coefficient can be obtained to give good performance for a single step response.

The inherent damping coefficient provides insufficient damping, when the step motor 10 is operated in an open loop mode and is brought to a stop. By controlling the torque on the step motor by use of the velocity feedback described herein, the step motor is sufficiently damped to minimize the undesired oscillatory motion at a desired stopping point and when running at the natural resonant frequency or subharmonics of the motor.

Referring now to FIG. 1, a schematic block diagram illustrates a step motor 10 that utilizes the velocity feedback of the present invention for damping. The step motor 10 includes a first main power phase winding 11 for phase A and a second main power phase winding 12 for phase B. The step motor 10 has two additional power phase windings when the stator is fabricated from two symmetrical halves. In accordance with the present invention, the step motor 10 also includes a first relatively small velocity coil 13 and a second relatively small velocity coil 14. Likewise, the step motor 10 includes two additional velocity coils when the stator is fabricated from symmetrical halves. The coils 13, 14 are mounted in the stator of the step motor 10 and provide output signals as the permanent magnet rotor of step motor 10 rotates past them. The velocity coils 13, 14 are disposed in quadrature to the main power windings 11, 12.

In order to control the torque on the step motor 10, the output signals of the velocity coils 13, 14 are applied to gain amplifiers 15, 16 which insert a gain K1 into each of the output signals. The outputs of the gain amplifiers 15, 16 are applied to gates 17, 18. The gates 17, 18 are each responsive to the output signal of its velocity coil 13, 14 and to a control signal generated by comparators 21, 22. The signals from comparators 21, 22 are generated by comparing the reference velocity and an actual velocity command. When the actual speed command is below the reference velocity, the comparators 21, 22 allow the gates 17, 18 to be on and apply the feedback signal to summing junctions 23, 24.

The summing junction 23, therefore, has two inputs i.e., the modified feedback signal from velocity coil 13 and a current command $I_a^*$ that is set up depending on the rating of the motor. The summing junction 23 sums the two inputs and provides an error signal to an amplifier 26. The summing junction 24 also has two inputs signals which include a current command $I_b^*$. The summing junction 24 also applies an error signal to the amplifier 26. The amplifier 26 amplifies the outputs of the summing junction 23, 24 and applies them to the respective main power phase windings 11, 12 via the power stage 27.

Referring to FIG. 4, a perspective view illustrates one half of a stator 30 of the step motor 10 built in accordance with the teachings of the present inventions. The stator 30 when joined with its symmetrical counterpart (not shown) forms the stator of the step motor 10. The stator 30 is a generally annular member which has the two power phase windings 11,12 encapsulated therein, and the symmetrical counterpart also includes two power phase windings. The power phase winding 11 is wound around winding cores 31, 32, 33, 38 and the power phase winding 12 is wound around winding cores 34, 35, 36, 37. Leads 41,44 extend from the power phase winding 11, and leads 42,43 extend from the power phase winding 12. Velocity coils 14,14a are disposed in phase with the power phase winding 11 and the velocity coils 13, 13a are disposed in phase with the power phase winding 12. The velocity coils 13,13a,14,14a are relatively small coils of thin copper wire disposed in cylindrical cavities formed between the stator half 30 and its symmetrical counterpart.

Figure 2:
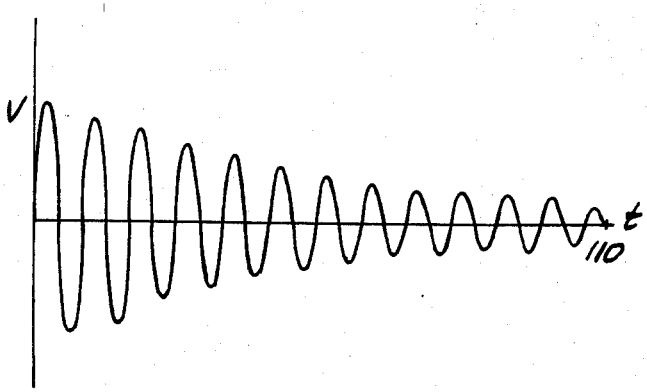
FIG. 2 is a waveform diagram of the output of the velocity coil when the step motor is brought to a stop in an open loop fashion.

Referring now to FIG. 2, a waveform diagram illustrates the single step response of the step motor 10 when it is operated in an open loop fashion and it is brought to a stop. The vertical axis indicates the output of either velocity coil 13 or 14 and horizontal axis is the time measured in milliseconds. The motion of the rotor is seriously oscillatory as it attempts to stop at its desired stopping point and the overshoot is greater than one step length. The settling time for the step motor 10 of FIG. 2 is greater than 110 milliseconds.

Figure 3:
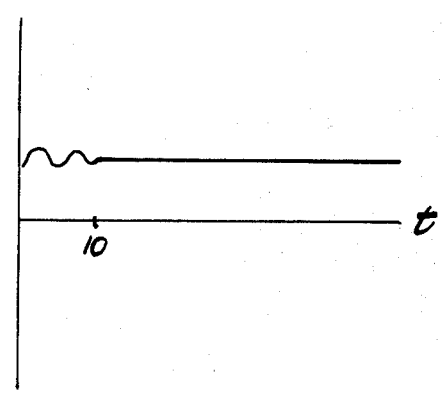
FIG. 3 is a waveform diagram of the output of the velocity coil when the step motor is brought to a stop utilizing the velocity feedback control of the present invention.

Referring now to FIG. 3, a waveform diagram illustrates the single step response of the closed loop system of the present invention. In FIG. 3, the vertical axis indicates the output of either velocity coil 13 or 14 and the horizontal axis is the time. It can be appreciated from FIG. 3 that there is very little oscillatory motion of the rotor as it approaches its desired stopping point. Moreover, there is over an order of magnitude improvement in settling time, since the settling time is limited to within 10 milliseconds.

The present invention, therefore, improves the performance of a step motor by reducing the oscillatory motion of the rotor about a desired stopping point. This improved performance is achieved at very little cost, and it does not increase the size nor inertia of the motor nor does it increase the power consumption of the motor.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A control system for a step motor of the type responsive to current command signals and having at least two power phase windings, wherein the improvement comprises:
a first velocity coil disposed in phase to the first power phase winding;
a second velocity coil disposed in phase to the second power phase winding;
means for generating a reference velocity signal;
means for feeding back the outputs of said first and second velocity coils; and
means for summing the outputs of said velocity coils with the current command signals when the velocity of the step motor is below the reference velocity signal, such that the step motor is sufficiently damped to minimize the step motor from oscillating about a desired stopping point when said current command signals are applied to the step motor.

2. A control system for a step motor according to claim 1 wherein said feedback means includes gain amplifying means for each of said first and second velocity coils, said gain amplifying means controlling the amount of damping for said step motor.

3. A control system for a step motor according to claim 2 wherein said feedback means further includes gating means for preventing the output of said first and second velocity coils from being fed back unless the velocity of said step motor has fallen below the predetermined reference velocity.

4. Control system for a step motor according to claim 3 which further includes third and fourth power phase windings, all of said power phase windings being disposed in two symmetrical stator halves, and third and fourth velocity coils disposed in phase to said third and fourth power phase windings.

5. A control system for a step motor responsive to current command signals and having at least two power phase windings, which comprises:
means for generating a first velocity signal in phase with the current in a first phase winding;
means for generating a second velocity signal in phase with the current in a second phase winding;
means for generating a reference velocity signal;
means for feeding back the first and second velocity signals; and
means for summing the first and second velocity signals with current command signals, when and only when the velocity of the step motor is below the reference velocity signal, whereby the step motor is sufficiently damped said current command signals are applied to the step motor.

6. A method for controlling a step motor responsive to command currents and having at least two power phase windings which comprises the steps of:
generating a first velocity signal in phase with the current in a first phase winding;
generating a second velocity signal in phase with the current in a second phase winding;
generating a predetermined reference velocity signal;
comparing the velocity of the step motor to the predetermined reference velocity signal;
summing the first and second velocity signals with current command signals when and only when the velocity command of the step motor is less than the predetermined reference velocity; and
applying said current command signals to the step motor in order to damp the step motor.

7. A method of controlling a step motor according to claim 6 which further includes the step of adjusting the gain of the first and second velocity signals.

* * * * *